United States Patent [19]

Billman

[11] Patent Number: 5,310,147
[45] Date of Patent: May 10, 1994

[54] BOAT KETTLE GRILL SUPPORT BRACKET

[76] Inventor: Therman R. Billman, 1309 Sandy Spring Dr., Nekoosa, Wis. 54457

[21] Appl. No.: 75,807

[22] Filed: Jun. 14, 1993

[51] Int. Cl.$^5$ ............................................. A47B 96/06
[52] U.S. Cl. ...................................... 248/214; 248/315
[58] Field of Search .................. 248/309.1, 315, 314, 248/214; 114/188; 211/71, 88; 126/25 R, 50

[56] References Cited

U.S. PATENT DOCUMENTS

| | | | |
|---|---|---|---|
| 759,435 | 5/1904 | Greeley | 248/315 |
| 1,218,204 | 3/1917 | Ohlson | 248/315 X |
| 1,421,890 | 7/1922 | Baker | 114/188 X |
| 2,379,206 | 6/1945 | Westlake | 114/188 X |
| 3,843,082 | 10/1974 | Garrett | 248/309.1 X |
| 5,009,380 | 4/1991 | Fee | 248/315 X |
| 5,033,448 | 7/1991 | Sandweg | 126/25 R |
| 5,118,059 | 6/1992 | Mainer | 248/314 X |
| 5,165,384 | 11/1992 | Knutson | 248/214 X |

FOREIGN PATENT DOCUMENTS 0389309 9/1990 European Pat. Off. ............ 248/315

Primary Examiner—J. Franklin Foss
Attorney, Agent, or Firm—Leon Gilden

[57] ABSTRACT

A bracket structure arranged for mounting to a guard rail portion of a boat member is provided, wherein the bracket is arranged to extend exteriorly of the boat member above the boat deck to position a cooking pot in a spaced relationship relative to the boat for minimizing fire damage to the boat in use of the cooking structure.

1 Claim, 3 Drawing Sheets

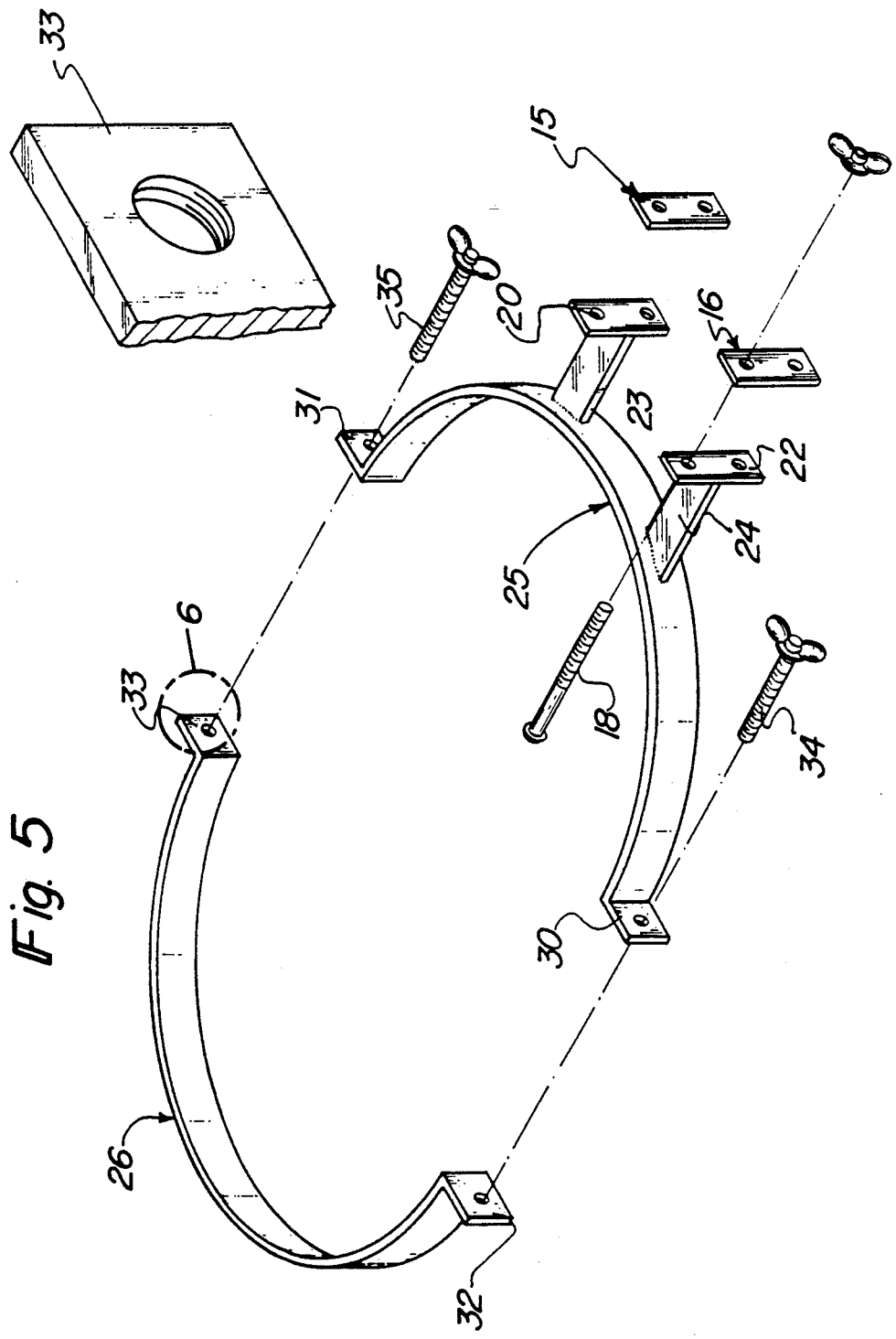

BOAT KETTLE GRILL SUPPORT BRACKET

BACKGROUND OF THE INVENTION

1. Field of the Invention

The field of invention relates to cooking support structure, and more particularly pertains to a new and improved boat kettle grill support bracket arranged to mount a kettle grill exteriorly of a boat deck.

2. Description of the Prior Art

U.S. Pat. No. 5,033,448 to Sandweg indicates a kettle grill support bracket structure having a kettle grill mounted exteriorly of a deck portion and supported to a handrail, wherein the organization fails to provide for the securement of the handrail structure in a manner as indicated in the instant invention.

The kettle grill support structure of the invention is arranged to fixedly secure in a fixed manner a kettle grill preventing its displacement during use and in this respect, the present invention substantially fulfills this need.

SUMMARY OF THE INVENTION

In view of the foregoing disadvantages inherent in the known types of grill support apparatus now present in the prior art, the present invention provides a boat kettle grill support bracket arranged to fixedly secure a kettle grill exteriorly of a boat deck portion to space a cooking chamber relative to the boat deck minimizing fire hazard. As such, the general purpose of the present invention, which will be described subsequently in greater detail, is to provide a new and improved boat kettle grill support bracket which has all the advantages of the prior art grill support apparatus and none of the disadvantages.

To attain this, the present invention provides a bracket structure arranged for mounting to a guard rail portion of a boat member, wherein the bracket is arranged to extend exteriorly of the boat member above the boat deck to position a cooking pot in a spaced relationship relative to the boat for minimizing fire damage to the boat in use of the cooling structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved boat kettle grill support bracket which has all the advantages of the prior art grill support apparatus and none of the disadvantages.

It is another object of the present invention to provide a new and improved boat kettle grill support bracket which may be easily and efficiently manufactured and marketed.

It is a further object of the present invention to provide a new and improved boat kettle grill support bracket which is of a durable and reliable construction.

An even further object of the present invention is to provide a new and improved boat kettle grill support bracket which is susceptible of a low cost of manufacture with regard to both materials and labor, and which accordingly is then susceptible of low prices of sale to the consuming public, thereby making such boat kettle grill support brackets economically available to the buying public.

Still yet another object of the present invention is to provide a new and improved boat kettle grill support bracket which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric exploded view of the invention.

FIG. 6 is an enlarged isometric illustration of section 6 as set forth in FIG. 5.

DESCRIPTION OF THE PREFERRED EMBODIMENT

Figure 1:
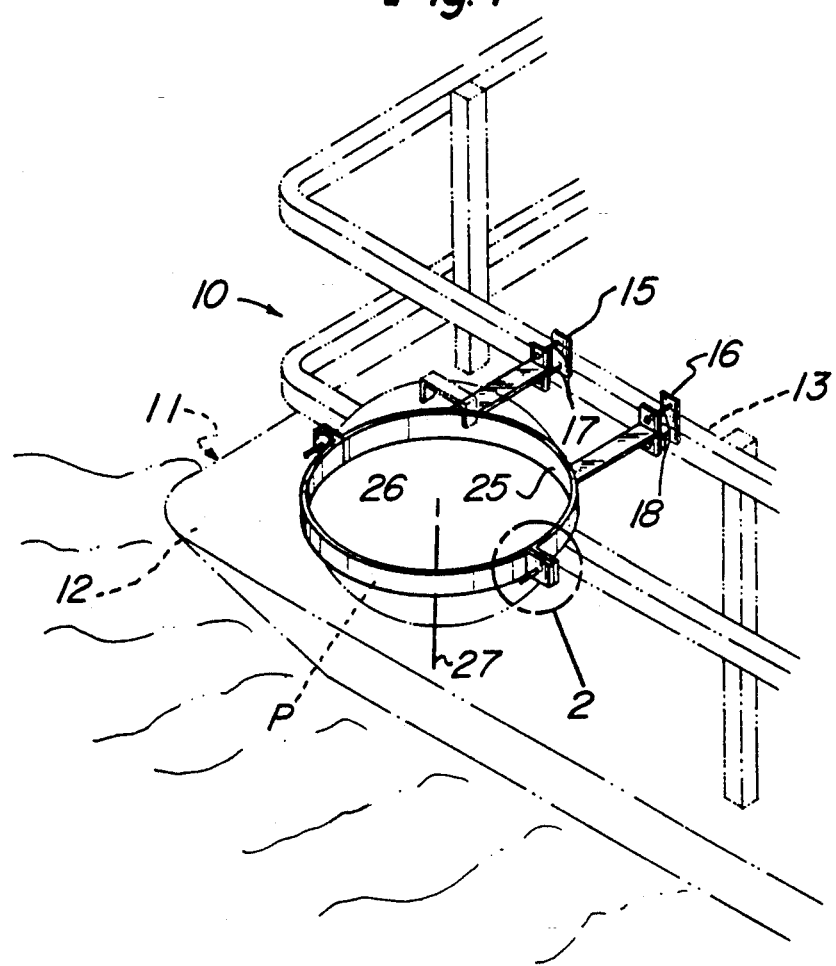
FIG. 1 is an isometric illustration of the invention in use.
Figure 2:
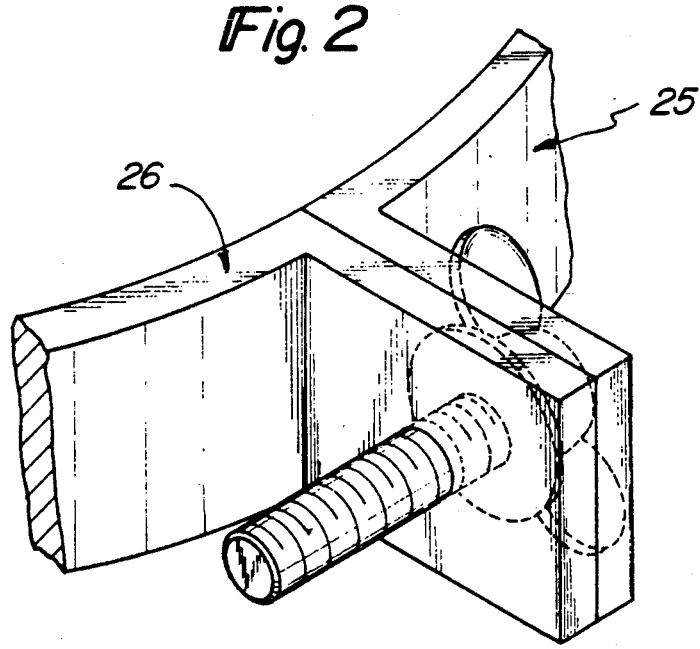
FIG. 2 is an enlarged isometric illustration of section 2 as set forth in FIG. 1.
Figure 3:
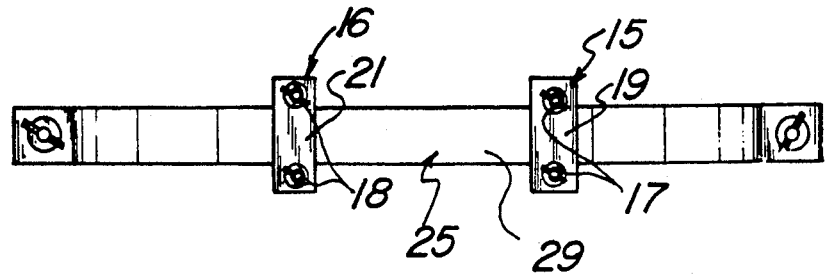
FIG. 3 is an orthographic end view of the invention.
Figure 4:
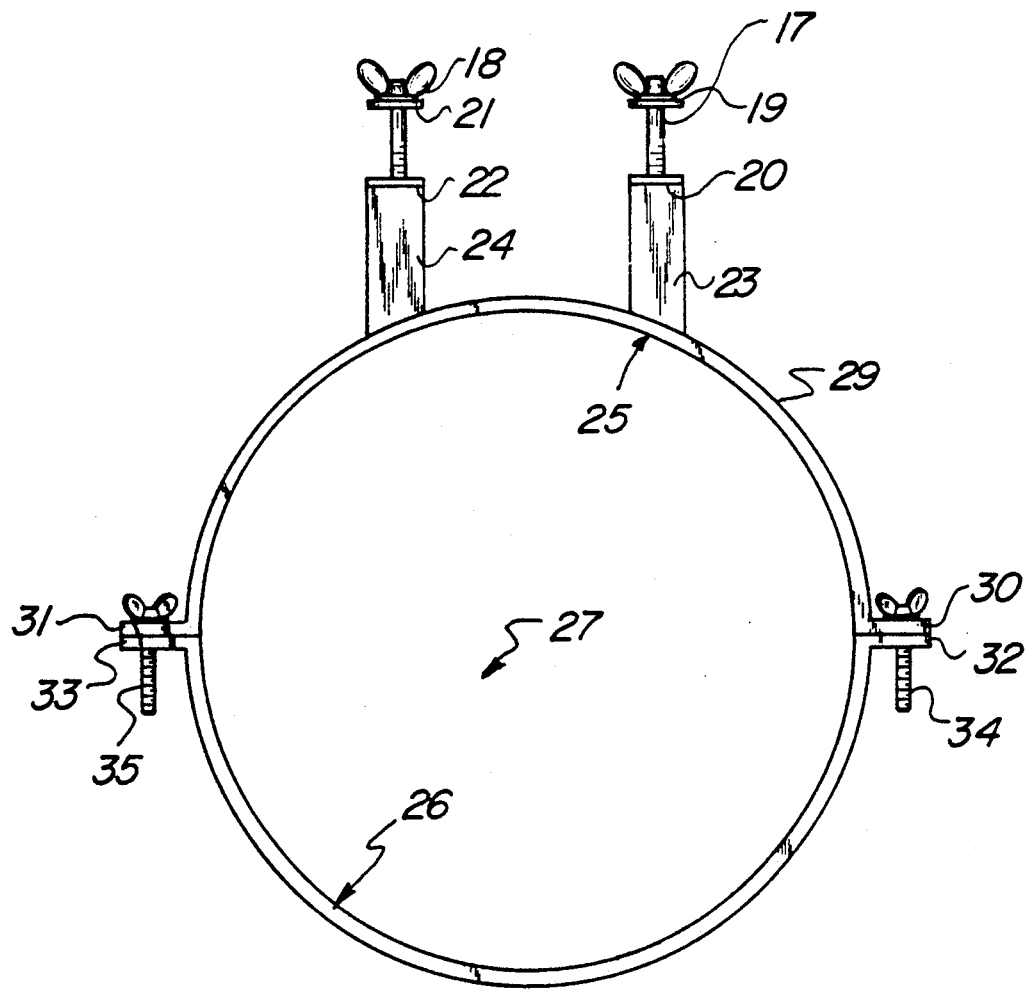
FIG. 4 is an orthographic top view of the invention.

With reference now to the drawings, and in particular to FIGS. 1 to 6 thereof, a new and improved boat kettle grill support bracket embodying the principles and concepts of the present invention and generally designated by the reference numeral 10 will be described.

More specifically, the boat kettle grill support bracket 10 of the instant invention essentially comprises mounting to a boat member 11, having a boat deck 12.

A handrail 13 is fixedly mounted to the boat deck 12 adjacent a periphery of the boat deck. The bracket structure 10 includes a first U-shaped bracket 16, with the first bracket 15 having a first bracket first leg plate 19 spaced from and parallel a first bracket second leg plate 20. A second bracket first leg plate 21 is arranged coplanar with the first bracket first leg plate 19 in a coextensive relationship, with a second bracket leg plate 22 parallel to the second bracket first leg plate 21 and parallel to the first bracket second leg plate 20 in a coplanar relationship. A first lock pin 17 is threadedly directed through the first bracket first leg plate 19, with a second lock pin 18 threadedly directed through the second bracket first leg plate 21. The first and second lock pins 17 and 18 include respective first and second abutment flanges, wherein a first abutment flange is spaced between the first bracket first and second leg plate, with a second abutment flange of the second bracket 16 positioned between the second bracket first and second plate structure. Further, the first and second lock pins clamp the handrail 13 in a secure and fixed relationship relative to the boat member 11.

A first spacer plate 23 orthogonally oriented relative to the first bracket second leg plate 20 extends exteriorly thereof, with a second spacer plate 24 coplanar and coextensive with the first spacer plate 23 and extends orthogonally and fixedly to the second bracket second plate 22. The first and second spacer plates 23 and 24, as indicated, are arranged in a coplanar and coextensive relationship parallel relative to one another and fixedly mounted to a first ring exterior wall 29 of a first semicylindrical ring 25. The first semi-cylindrical ring 25 is arranged for securement to a second semi-cylindrical ring 26, with the first and second semi-cylindrical rings 25 and 26 concentric about a ring axis 27 when the first and second rings 25 and 26 are secured together.

The first ring 25 includes respective first ring first and second flanges 30 and 31 that are coplanar relative to one another and extend radially and exteriorly of the first ring projecting beyond the first ring exterior wall 29. The second ring 26 includes second ring first and second flanges 32 and 33 that are arranged in a facing parallel relationship relative to the first ring first and second flanges 30 and 31 arranged for contiguous communication therewith. The first ring first and second flanges 30 and 31 slidably receive first and second fasteners 34 and 35 respectively orthogonally therethrough, with the first and second fasteners 34 and 35 arranged for threaded reception within the respective second ring first and second flanges 32 and 33. In this manner, the fasteners are arranged for loosening prior to the positioning of a cooking pot "p" within the ring structure, as indicated in FIG. 1, and are subsequently tightened to fixedly secure the cooking pot therewithin for fixed securement during a cooling procedure preventing inadvertant displacement of the cooking pot when mounted to the boat member handrail 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A boat kettle grill support bracket arranged for securement to a handrail of a boat member, wherein the support bracket comprises, a first U-shaped bracket spaced from, parallel to, and coextensive relative to a second U-shaped bracket, the first U-shaped bracket includes a first bracket first leg plate parallel and coextensive to a first bracket second leg plate, the second bracket including a second bracket first leg plate parallel to and coextensive to a second bracket second leg plate, and the first U-shaped bracket and the second U-shaped bracket arranged to receive the handrail therewithin, wherein the first U-shaped bracket includes a first spacer plate, and the second U-shaped bracket includes a second spacer plate, with the first spacer plate orthogonally and fixedly mounted to the first bracket second leg plate, and the second spacer plate fixedly and orthogonally mounted to the second bracket second leg plate, and ring means mounted to the first spacer plate and the second spacer plate for receiving a cooking pot therewithin, and a first lock pin in threadedly and orthogonally received through the first bracket first leg plate and a second lock pin is threadly and orthogonally received through the second bracket first leg plate, wherein the first lock pin includes a first abutment plate oriented between the first bracket first leg plate and the first bracket second leg plate to engage a handrail, and a second lock pin includes a second abutment plate positioned between the second bracket first leg plate and the second bracket second leg plate for engaging the handrail, and the first spacer plate and the second spacer plate arranged in a parallel, coplanar, and coextensive relationship, and the ring means includes a first semi-cylindrical ring having a first ring exterior wall, and a second semicylindrical ring secured to the first semi-cylindrical ring, wherein the first ring and the second ring are concentric about a predetermined axis, and the axis is arranged parallel to the first bracket second leg plate and the second bracket leg plate and oriented medially of the first bracket second leg plate and the second bracket second leg plate, and the first ring includes a first ring first flange as a first end of the first ring, and a first ring second flange at a second end of the first ring, wherein the first ring first flange and the first ring second flange are arranged in a parallel, coplanar relationship, and the second ring having a second ring first flange mounted fixedly to a first end of the second ring, and a second ring second flange fixedly mounted to a second end of the second ring, wherein the second ring first flange and the second ring second flange are arranged in a coplanar relationship, and a first fastener slidably received in an orthogonal relationship relative to the first ring first flange, and threadedly received within the first ring second flange, and a second fastener slidably received through the second ring first flange and threadedly received within the second ring second flange, wherein the first fastener and the second fastener are arranged parallel relative to one another permitting selective securement of the first ring to the second ring for securement of a cooling pot between the first ring and the second ring.

* * * * *